US 6,626,273 B1

(12) United States Patent
Baumgartner et al.

(10) Patent No.: US 6,626,273 B1
(45) Date of Patent: Sep. 30, 2003

(54) BRAKE DISK AND CORRESPONDING AXLE HUB

(75) Inventors: Hans Baumgartner, Moosburg (DE); Wolfgang Pahle, Heilbronn (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 09/786,269

(22) PCT Filed: Aug. 19, 1999

(86) PCT No.: PCT/EP99/06069

§ 371 (c)(1),
(2), (4) Date: Aug. 13, 2001

(87) PCT Pub. No.: WO00/14423

PCT Pub. Date: Mar. 16, 2000

(30) Foreign Application Priority Data

Sep. 2, 1998 (DE) .......................................... 198 39 844

(51) Int. Cl.[7] ............................................... F16D 65/78
(52) U.S. Cl. ........................... 188/264 A; 188/218 XL; 188/264 AA; 188/71.6; 192/113.23
(58) Field of Search ............................ 188/17, 218 XL, 188/18 A, 264 A, 264 AA, 26, 71.6, 206 R; 301/6.1, 6.3, 6.8, 105.1; 192/113.2, 113.23, 113.26

(56) References Cited

U.S. PATENT DOCUMENTS 4,913,266 A * 4/1990 Russell et al. ............. 188/18 A
5,224,572 A * 7/1993 Smolen, Jr. et al. .. 188/218 XL
5,297,660 A * 3/1994 Wiebelhaus et al. .. 188/218 XL
6,098,764 A * 8/2000 Wirth et al. .......... 188/218 XL
6,139,215 A * 10/2000 Kuhne et al. ............. 188/18 A
6,446,765 B1 * 9/2002 Dabertrand et al. ...... 118/18 A

FOREIGN PATENT DOCUMENTS

| DE | 1222962 | 8/1966 | |
| DE | 3814614 A1 * | 11/1989 | ........... 188/218 XL |
| DE | 19544559 | 11/1995 | |
| DE | 19628331 | 1/1998 | |
| DE | 19648582 | 5/1998 | |
| DE | 19751522 | 5/1999 | |
| FR | 1326205 | 3/1963 | |
| JP | 61-48622 | 3/1986 | |
| WO | WO 93/14945 | 8/1993 | |

* cited by examiner

Primary Examiner—Jack Lavinder
Assistant Examiner—Mariano Sy
(74) Attorney, Agent, or Firm—Crowell & Moring LLP

(57) ABSTRACT

The invention relates to a brake disk comprising two friction rings which are connected via links and between which an air channel is configured, as well as support elements which are molded to the inner peripheral area of the brake disk and designed for engaging cams of a hub of an axle of a (utility) vehicle. In the inner peripheral area of the brake disk, the support elements bridge the air channel in the manner of links and axially protrude into the area of the friction rings to such an extent that the outer surfaces of the friction rings are situated at an axial distance from the outer surfaces of the support elements even in the maximum permissible state of wear. Openings in the axle hub and the brake disk ensure sufficient cooling.

17 Claims, 9 Drawing Sheets

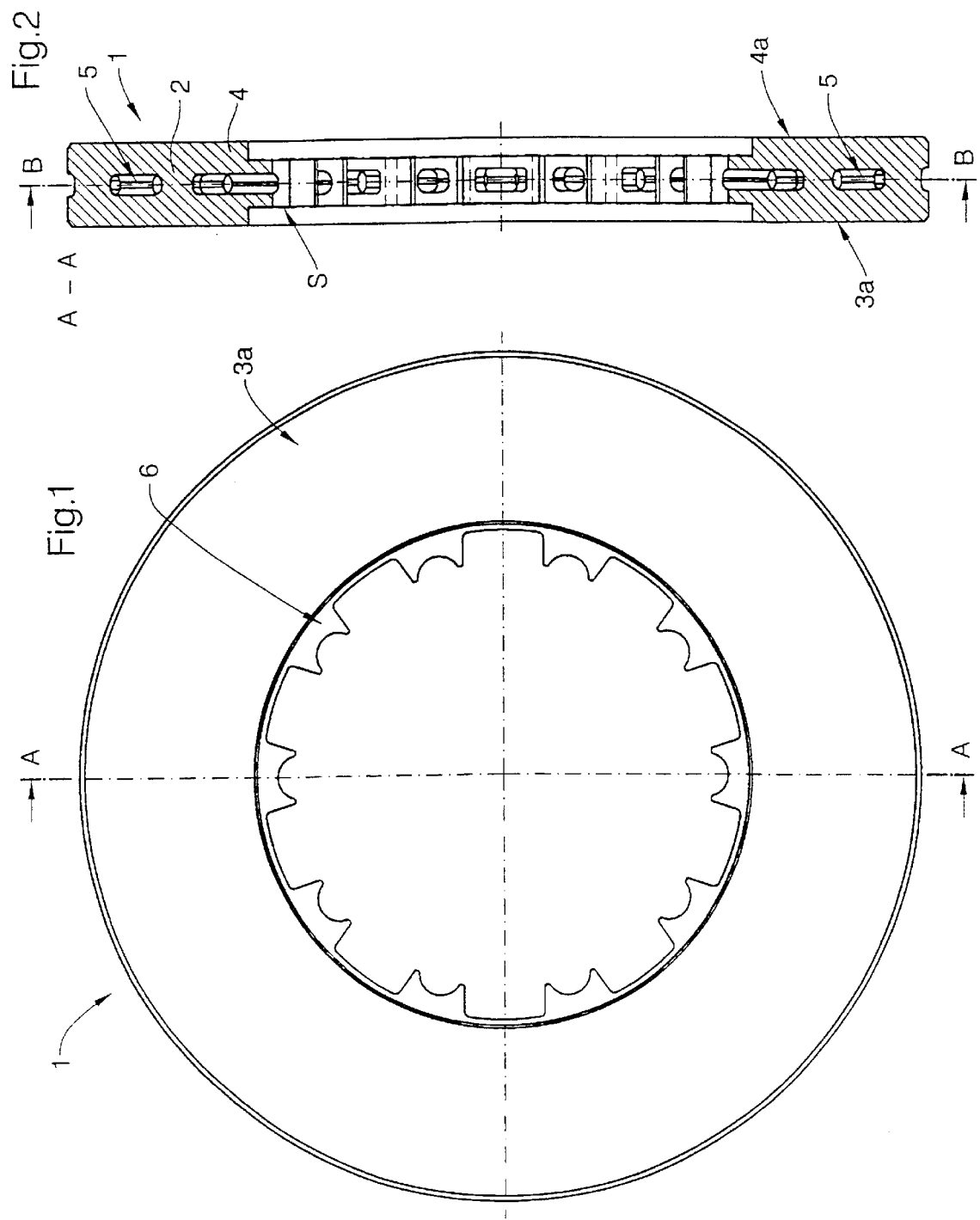

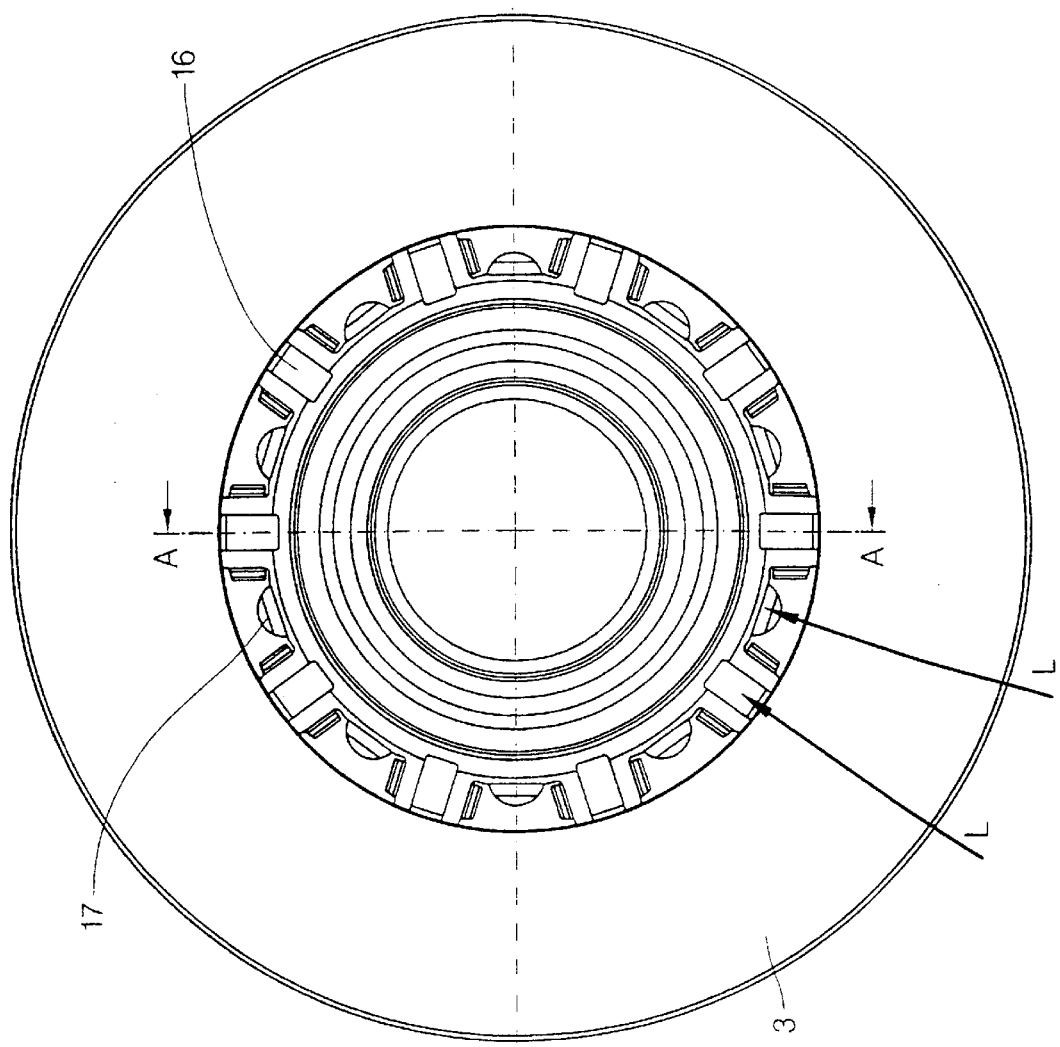
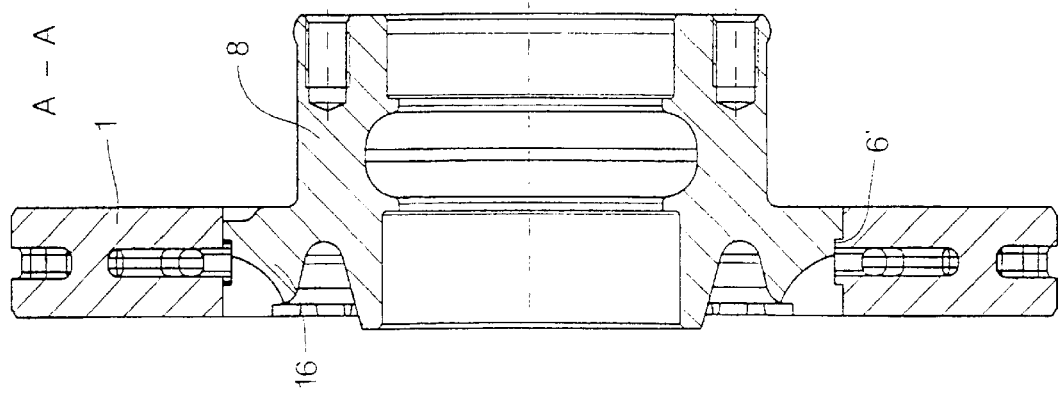

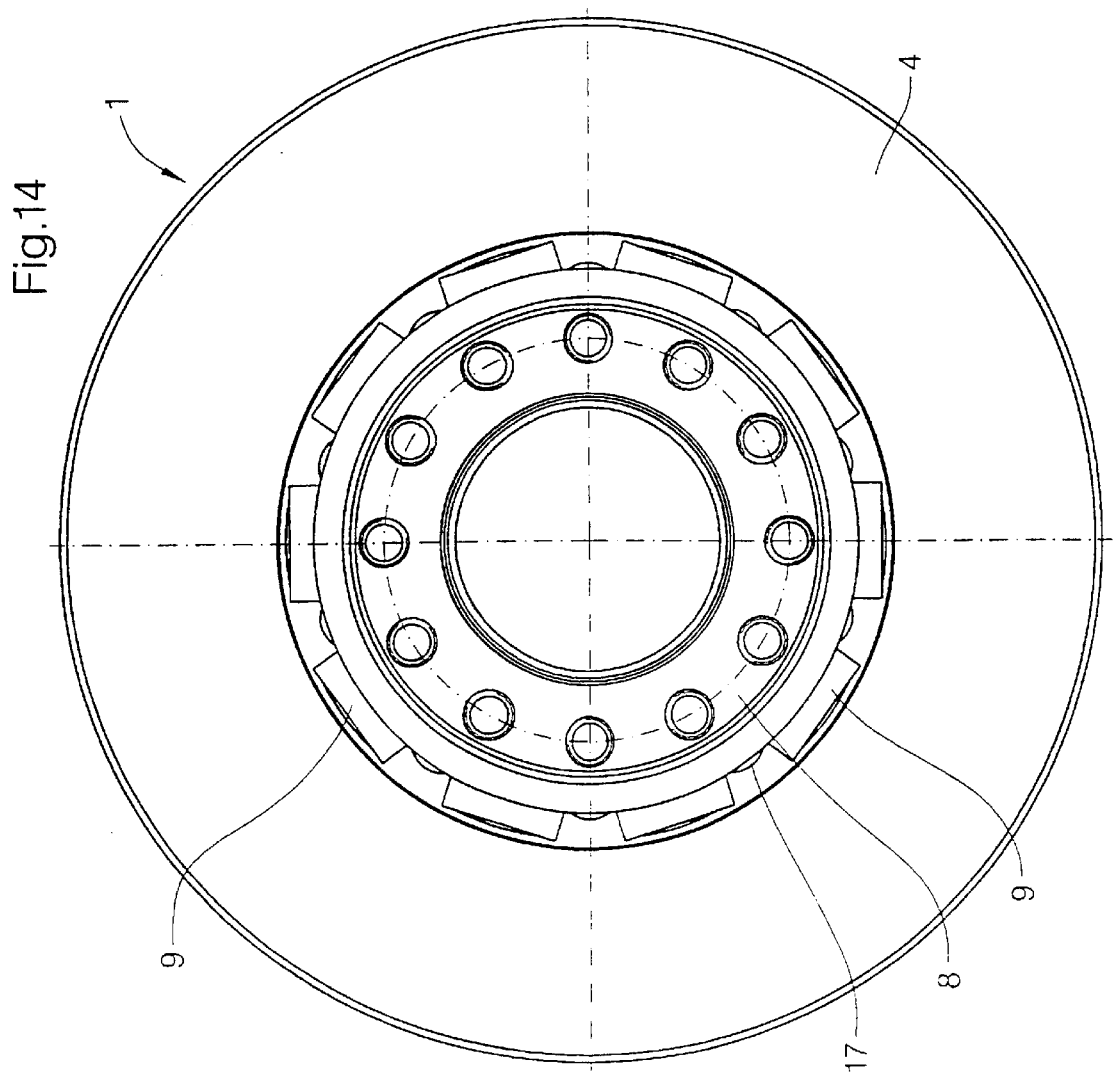

BRAKE DISK AND CORRESPONDING AXLE HUB

BACKGROUND AND SUMMARY OF THE INVENTION

The invention relates to a brake disk and to an axle hub for the brake disk.

A brake disk of a "two-part" construction is known from German patent document DE 195 44 559 C1. For connecting the brake disk with the hub, in German patent document 195 44 559 C1, intermediate elements are provided in the case of this brake disk for transmitting the torque and the power from the cams of the hub to the support elements of the disk, which intermediate elements can be fastened, for example, by bolts on the cams of the hub. In this case, on the one hand, the cams of the hub engage in the intermediate elements and, on the other hand, the intermediate elements engage in the support elements so that a reliable torque transmission is ensured from the brake disk to the hub in both rotating directions.

The brake disk of German patent document DE 195 44 559 C1 has been found successful per se, but a further minimizing of the temperature insensitivity of the brake disk at high stress is desirable. Particularly, the tendency of the brake disk to form cracks is to be reduced.

A brake disk and an axle hub of the above-mentioned type are known from French patent document FR 901 778. Based on this prior art, it is an object of the invention to further reduce the temperature sensitivity in the case of the brake disk and the hub. The corresponding further development of the axle hub for placing the brake disk should also be optimized.

The invention achieves this goal by means of the present invention, whose objects, viewed separately, clearly increase the stressing capacity of the brake disk and which, in their combination, supplement one another to form a particularly advantageous and highly stressable brake disk (and axle hub).

In comparison to the above-mentioned prior art, the object of the present invention is characterized in that, on the inner periphery of the brake disk, the support elements bridge the air channel in the manner of links and protrude far axially at the ratio indicated into the area of the friction rings so that the outer surfaces of the friction rings are situated at an axial distance from the outer surfaces of the support elements—particularly even when exhibiting their maximally permissible state of wear—, the spacing of the outer surfaces of the support elements being at a prescribed ratio.

With respect to the prior art of the above-mentioned type, this solution has the special advantage that the friction surfaces, which are thermally highly stressed during braking, are separated from the support elements, which are mechanically highly stressed (by the braking forces).

Although it is known from the field of rail vehicle brake disks (see German patent document DE 38 14 614 A1) to place the support elements (occasionally also called teeth) axially in the area of the air channel, the support elements being configured as knobs lengthened radially from the links of the brake disk toward the inside, this solution cannot be applied to brake disks for commercial vehicles, particularly of a weight of more than 7.5 t, because of the much higher forces occurring during the braking. It is therefore advantageous that the invention increases the mechanical stability because the support elements protrude into the friction rings.

Although it would also be conceivable to extend the support elements over the air channel axially to the outer surfaces of the friction rings, this solution has the disadvantage that high thermal and mechanical stresses would be superimposed in the "feet" of the support elements, which would clearly increase the tendency of the brake disk to form cracks. As a result of the local separation of the friction surface from the exterior side of the support elements, the invention provides a clear improvement here.

A further embodiment of the invention is characterized in that the support elements are provided with feeding devices for feeding cooling air into the air channel. This embodiment also provides a clearly improved thermal behavior of the radially toothed brake disks. The brake disk is provided with an air channel formed of ribs or knobs between the two friction rings, which is known per se from the initially mentioned prior art. As a result of this variant of the invention, additional cooling air can flow through the support elements and thereby clearly increase the cooling effect of the cooling air channel. This measure therefore also provides an improved thermal behavior of the brake disk in comparison to the prior art. The feeding devices are expediently constructed as bores which extend essentially radially with respect to the brake disk.

The brake disk is preferably supplemented by an axle hub on which is placed a brake disk according to the invention, which is characterized in that the axle hub and/or an adapter, which can be inserted between the axle hub and the brake disk, is provided with hub bores or openings, which are opened radially toward the inside or laterally axially toward the outside, for feeding cooling air into the bores of the support element and/or directly into the air channel constructed between the friction rings. This further increases the cooling of the brake disk in a constructively simple manner.

Additional advantageous variants of the invention are contained in the other subclaims.

In the following, the invention will be explained in detail with respect to the drawing by means of embodiments.

BRIEF DESCRIPTION OF THE DRAWINGS

FIG. 1 is a lateral view of a first embodiment of the invention;

FIG. 2 is a sectional view A—A from FIG. 1;

FIG. 12 is a lateral view of the embodiment of FIG. 10;

FIG. 13 is a sectional view A—A from FIG. 12;

FIG. 14 is a rear view of the embodiment of FIGS. 10 to 12.

DETAILED DESCRIPTION OF THE DRAWINGS

Figure 3:
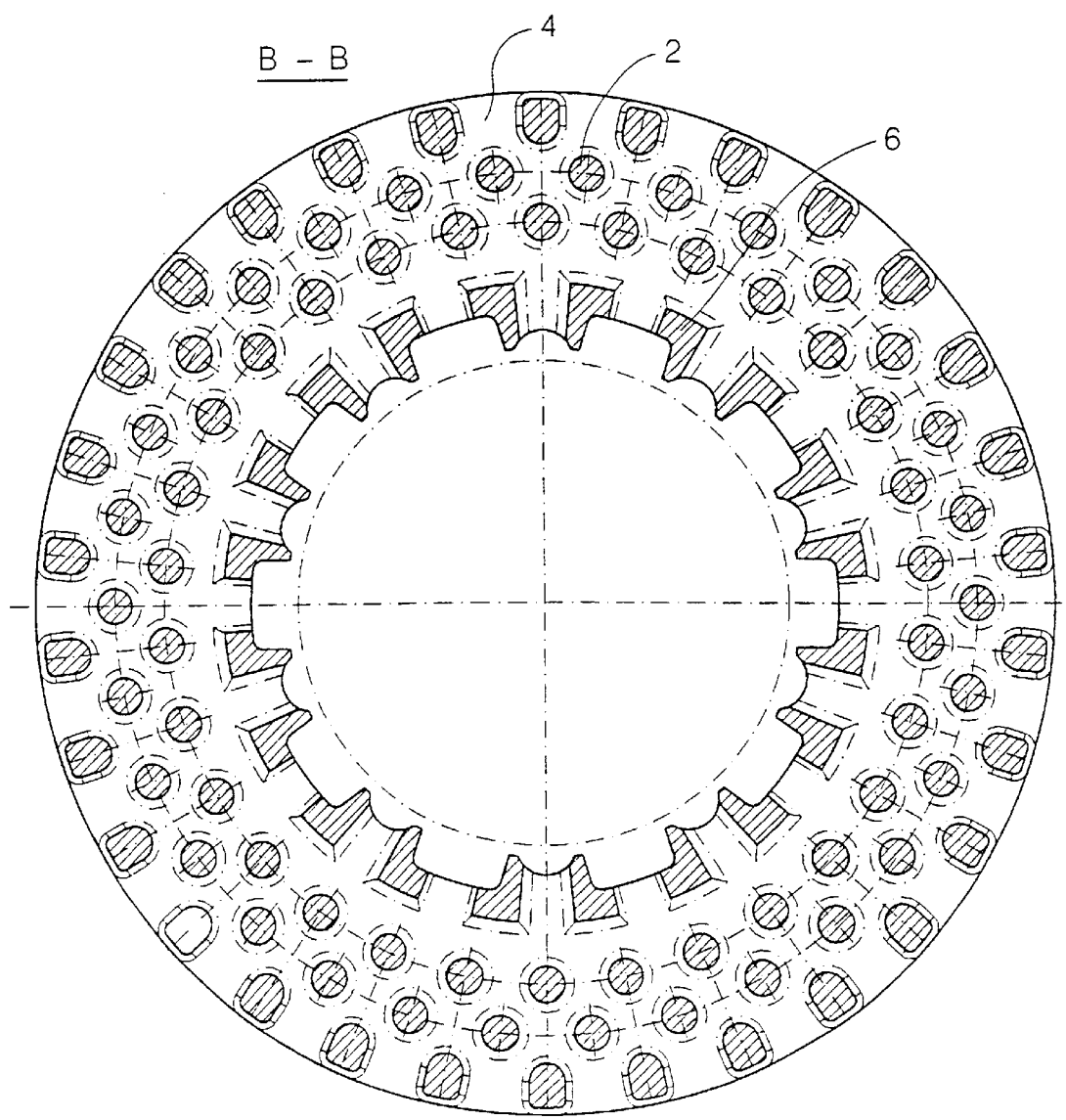
FIG. 3 is a sectional view B—B from FIG. 2.
Figure 6:
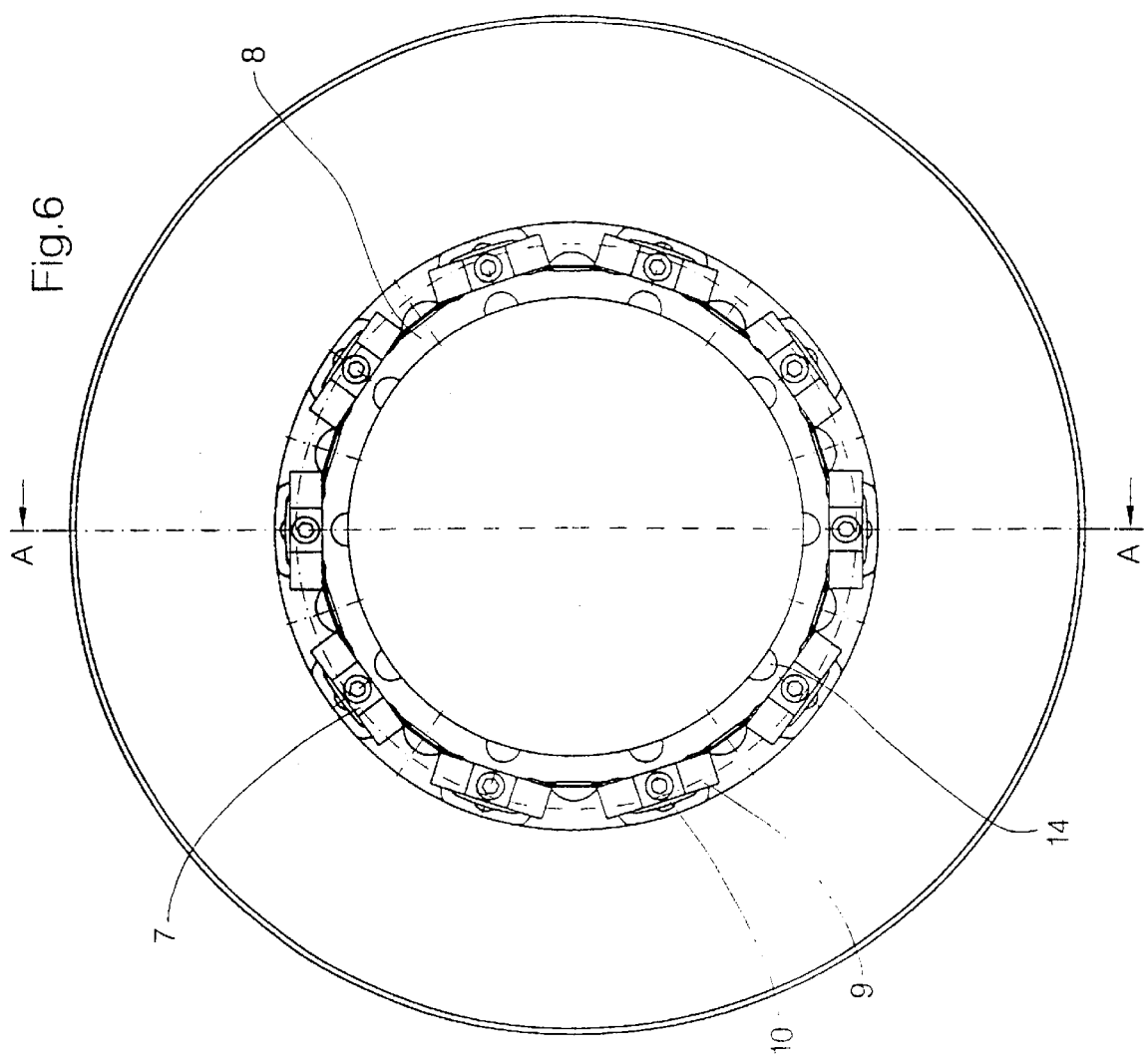
FIG. 6 is a lateral view of a brake disk of another embodiment of the invention placed onto an axle hub.
Figure 7:
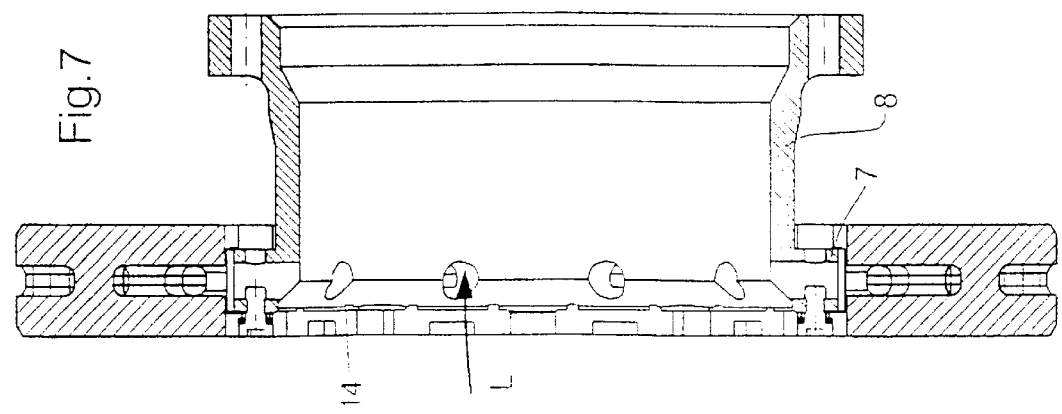
FIG. 7 is a sectional view A—A from FIG. 8.

FIGS. 1, 2 and 3 are views of a brake disk 1 for disk brakes of commercial vehicles. The brake disk 1 has friction rings 3, 4 which are connected with one another by way of links 2. The links 2 are arranged in several concentric rings, so that a ventilation channel (air channel) 5 is configured between the friction rings 3, 4. Support elements 6 are molded to the inner peripheral area of the brake disk 1, which support elements (see FIGS. 6 and 7) are designed for a tooth-type engagement in cams 7 of an axle hub 8. Clamp-type U-shaped and axially placeable intermediate elements 9, which are fastened by means of bolts 10, provide a secure axial (and radial) fitting of the brake disk 1 on the hub 7.

Figure 4:
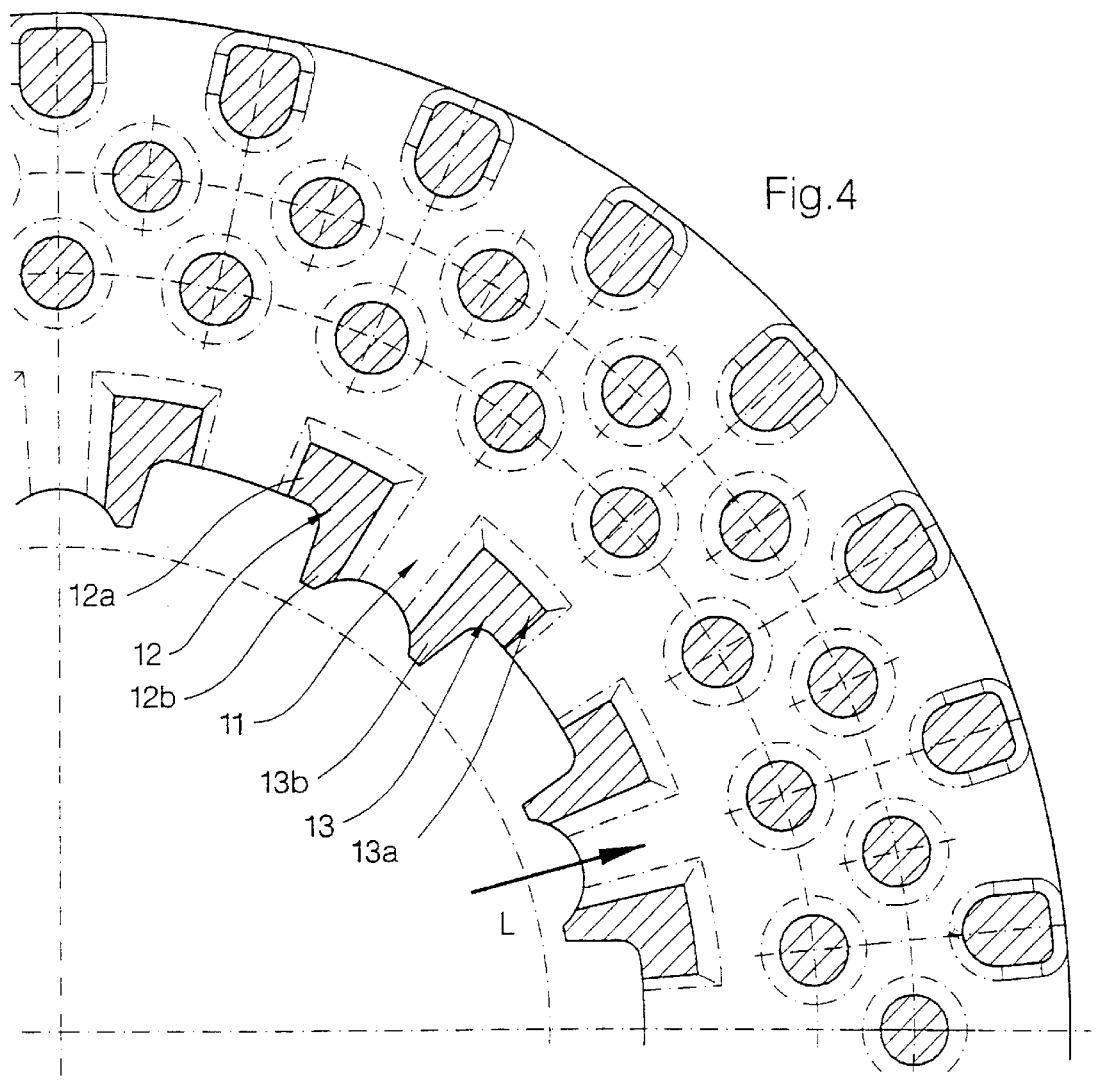
FIG. 4 is an enlargement of a cutout from FIG. 3.
Figure 5:
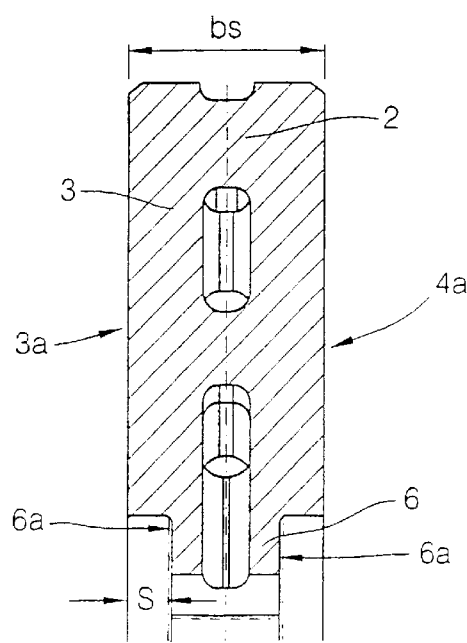
FIG. 5 is an enlargement of a cutout from FIG. 2.

As illustrated particularly well in FIGS. 4 and 5, the support elements 6 bridge the air channel 5 in the manner of links on the inner periphery of the brake disk 1. The support elements 6 project axially into the area of the friction rings 3, 4 (or are molded to these in one piece on the inside) so far that the outer surfaces 3a, 4a of the friction rings 3, 4 (broken line Smax), also in their maximally permissible state of wear, remain situated at an axial distance from the outer surfaces 6a of the support elements. As a result, even in the maximal condition of wear, a certain separation will still exist between the site of maximal thermal stress and the site of maximal mechanical stress (which is also illustrated in the center sectional view of the brake disk 1 according to FIG. 2). The distance between the outer surfaces 3a, 4a and the outer surfaces 6a of the support elements is marked S and in this case amounts to 10 mm at a disk thickness of bs=45 mm. The preferable ratio is 3<=bs/s<=6.

As also easily visible in FIGS. 4 and 5, the support elements 6 are provided with advantageous feeding devices 11 for cooling air (flow L) into the air channel 5. The support elements 6 (see also FIG. 4 in this respect) consist essentially of two L-shaped sections 12, 13 which together form a type of T-shape, the web of the T or the base sides 12a, 13a of the two L-shaped sections 12, 13 projecting radially into the air channel 5, and the longitudinal legs 12b, 13b of the L-shaped sections 12, 13 each projecting radially toward the interior over the inner periphery of the friction rings 3, 4. The two L-shaped sections 12, 13 are each aligned to face away from one another and ensure a large-surface introduction of force into the friction rings 3, 4.

Figure 8:
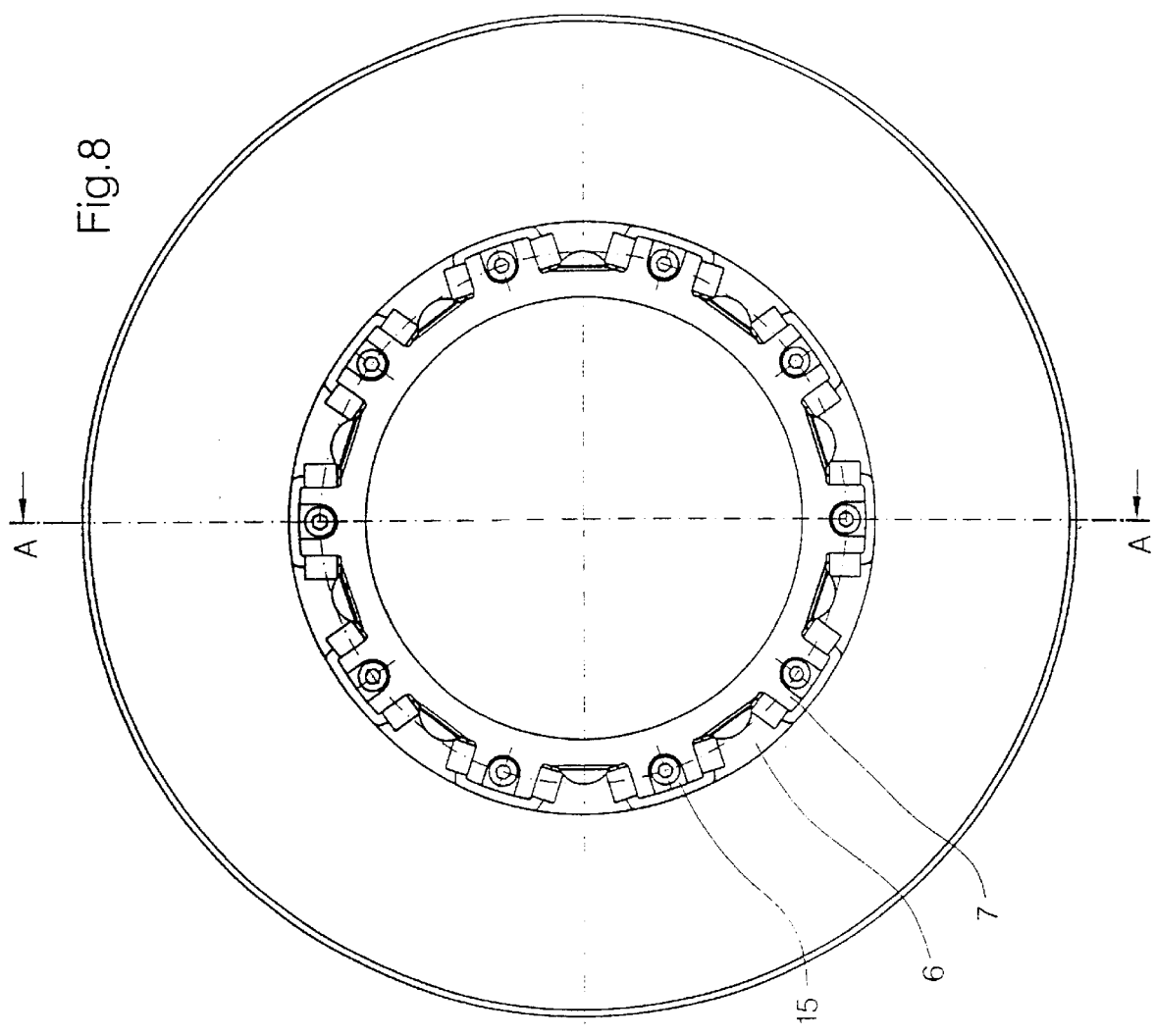
FIG. 8 is a lateral view of a brake disk of a third embodiment of the invention placed on an axle hub.
Figure 9:
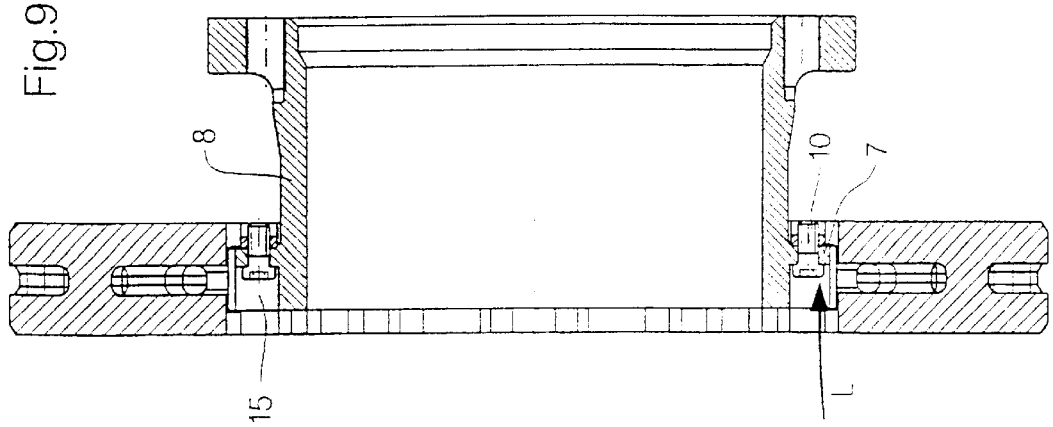
FIG. 9 is a sectional view A—A from FIG. 8.
Figure 10:
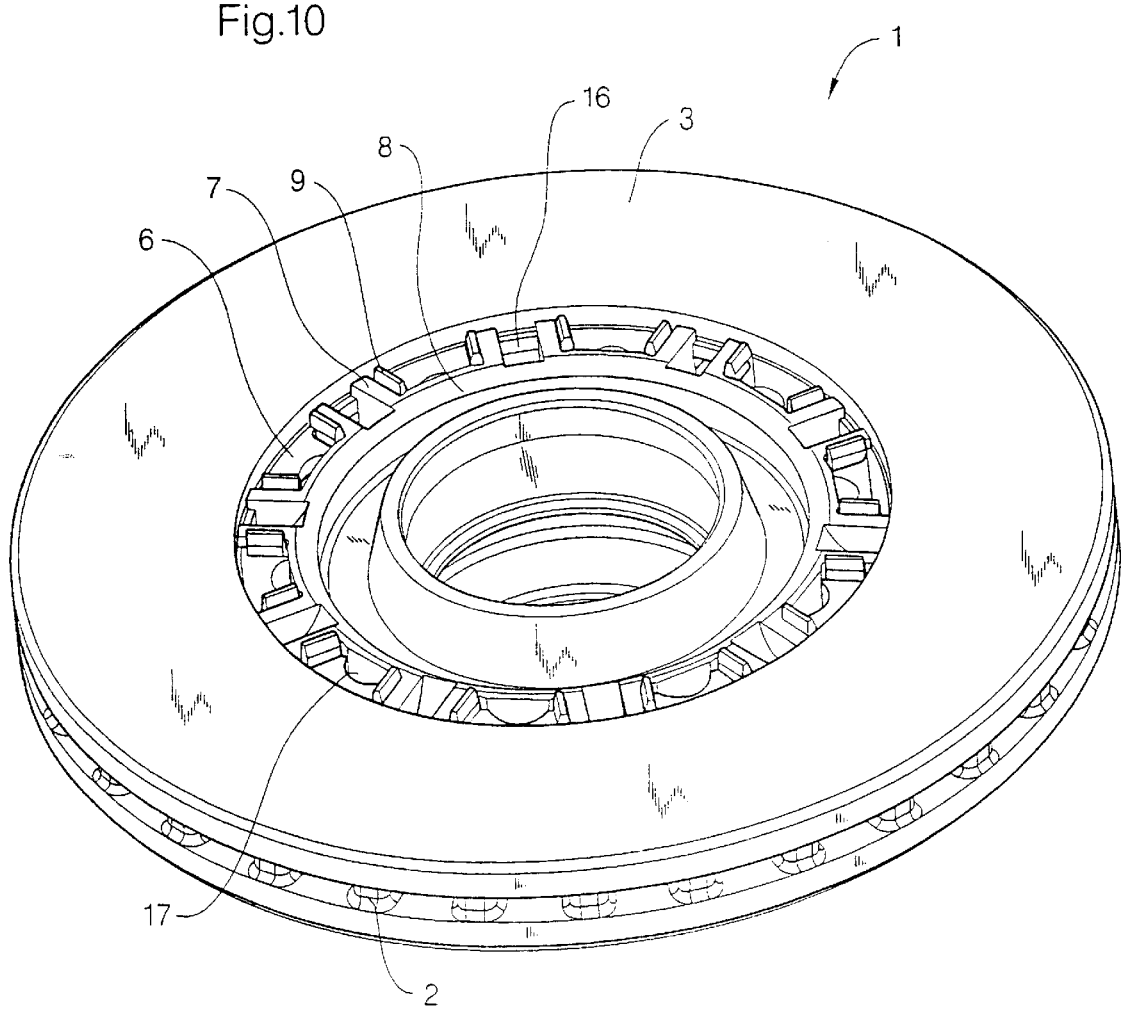
FIG. 10 is a perspective view of a fourth embodiment of the invention.
Figure 11:
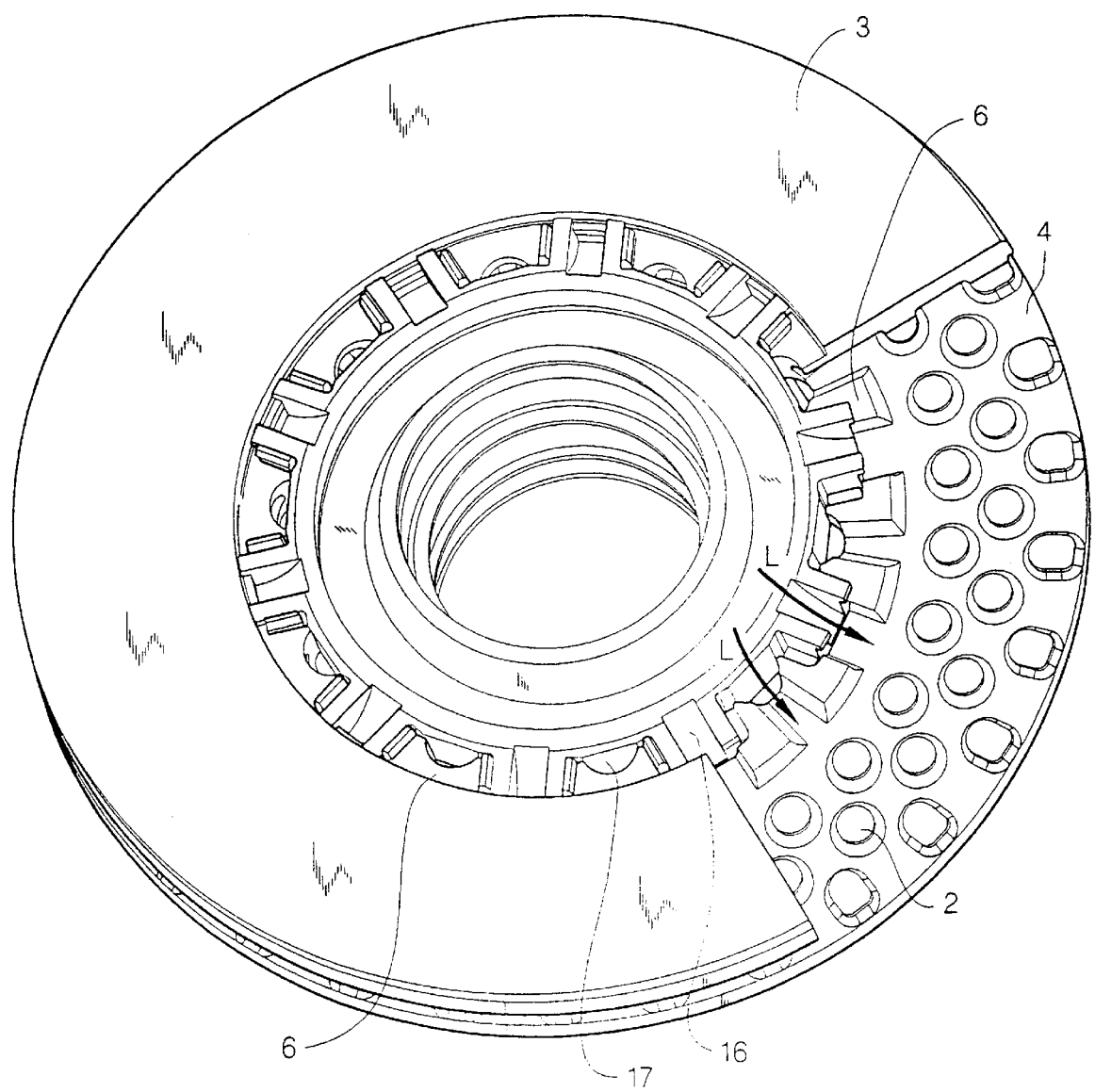
FIG. 11 is another perspective view of the embodiment of FIG. 10, where a partial area of a friction ring is omitted.

So that, also in the mounted condition of the brake disk 1 on the pot-shaped axle hub 8 or the hub section, the ventilation is not covered by the axle hub 8, the axle hub or an optional adapter (not shown) is provided with essentially radially extending hub bores 14 (see FIGS. 6 and 7) or with lateral or axial hub openings 15 (see FIGS. 8 and 9), which lead from the inner periphery of the hub radially or axially to the feeding devices 11 and, interacting with the radial feeding devices 11 and optional additional openings in the vehicle hub, always ensure a good cooling capacity.

FIGS. 10 to 14 show a combined cooling air feeding through optional lateral cam openings 16 in the cams 7 of the hub 8 and through lateral openings 17 remaining between the L-shaped sections 12 and 13 and the hub 8 when the hub 8 and the brake disk 1 are assembled. As a result, air is guided directly through the lateral cam openings 16 of the cams 7 through the hub 8 into the air channel 5 and, through the openings 17 and the feeding devices 11, additional air is guided into the air channel 5. The cam openings 16 extend from the axial exterior sides of the cams 7 in the manner of bores into the air channel 5 and extend in a sloped manner with respect to the brake disk plane.

| Table of Reference Numbers | |
|---|---|
| Brake disk | 1 |
| links | 2 |
| friction rings | 3, 4 |
| air channel | 5 |
| support elements | 6 |
| cams | 7 |
| axle hub | 8 |
| intermediate elements | 9 |
| bolt | 10 |
| feeding devices | 11 |
| sections | 12, 13 |
| base sides | 12a, 13a |
| longitudinal legs | 12b, 13b |
| bores | 14 |
| hub openings | 15 |
| cam openings | 16 |
| openings | 17 |

What is claimed is:

1. A brake disk for a pneumatically operated disk brake of a vehicle, comprising:

two friction rings mutually connected by way of links, between which at least one air channel is configured;

support elements molded to an inner peripheral area of the brake disk and designed to engage in cams of a hub on an axle of the vehicle;

wherein the support elements on the inner peripheral area of the brake disk bridge the air channel in a link manner, and wherein outer surfaces of the two friction rings are situated at an axial distance from outer surfaces of the support elements such that the axial distance of the outer surfaces of the friction rings from the outer surfaces of the support elements meets the condition: 3<=bs/s<=6, where s is the axial distance and bs is a thickness of the brake disk; and wherein at least several of the support elements are each provided with a feeding device for feeding cooling air through the support element into the air channel.

2. The brake disk according to claim 1, wherein the feeding device is a bore extending essentially radially with respect to the brake disk.

3. A brake disk for a pneumatically operated disk brake of a vehicle, comprising:

two friction rings mutually connected by way of links, between which at least one air channel is configured;

support elements molded to an inner peripheral area of the brake disk and designed to engage in cams of a hub on an axle of the vehicle;

wherein the support elements on the inner peripheral area of the brake disk bridge the air channel in a link manner, and wherein outer surfaces of the two friction rings are situated at an axial distance from outer surfaces of the support elements such that the axial distance of the outer surfaces of the friction rings from the outer surfaces of the support elements meets the condition: 3<=bs/s<=6, where s is the axial distance and bs is a thickness of the brake disk; and wherein the support elements have an essentially T-shape, such that webs of the T-shape are provided with radially extending feeding devices for feeding cooling air.

4. The brake disk according to claim 3, wherein the T-shaped support elements are each formed of two L-shaped sections, base sides of the two L-shaped sections adjoining one another and extending radially into the air channel, longitudinal legs of the L-shaped sections each projecting radially inward over the inner peripheral area of the friction rings.

5. The brake disk according to claim 4, wherein axial openings are configured between the longitudinal legs of the L-shaped sections, said axial openings leading into the feeding devices and/or forming a portion of the feeding devices.

6. The brake disk according to claim 3, further comprising intermediate elements axially fixing the brake disk on the cams of the hub, said intermediate elements being placeable between the cams and the support elements.

7. The brake disk according to claim 3, wherein said brake disk is for a commercial vehicle.

8. An axle hub having a brake disk according to claim 3, wherein the axle hub is configured with hub bores or hub openings opened radially toward an interior or laterally axially toward an exterior for feeding cooling air into bores of the support elements and/or directly into the air channel formed between the two friction rings, the cams being provided with cam openings which, starting from axial outer sides of the cams in a boring manner lead into the air channel, and wherein the cam openings extend in a sloped manner with respect to a plane of the brake disk.

9. An adapter mountable on an axle hub having a brake disk according to claim 3, wherein the adapter is configured with hub bores or hub openings opened radially toward an interior or laterally axially toward an exterior for feeding cooling air into bores of the support elements and/or directly into the air channel formed between the two friction rings, the cams being provided with cam openings which, starting from axial outer sides of the cams in a boring manner lead into the air channel, and wherein the cam openings extend in a sloped manner with respect to a plane of the brake disk.

10. A brake disk for a pneumatically operated disk brake of a vehicle, comprising:
two friction rings mutually connected by way of links, between which at least one air channel is configured;
support elements molded to an inner peripheral area of the brake disk and designed to engage in cams of a hub on an axle of the vehicle;
wherein the support elements on the inner peripheral area of the brake disk bridge the air channel in a link manner, and wherein outer surfaces of the two friction rings are situated at an axial distance from outer surfaces of the support elements such that the axial distance of the outer surfaces of the friction rings from the outer surfaces of the support elements meets the condition: $3<=bs/s<=6$, where s is the axial distance and bs is a thickness of the brake disk;
wherein the support elements are provided with a feeding device for feeding cooling air into the air channel; and
wherein the support elements have an essentially T-shape, such that webs of the T-shape are provided with the radially extending feeding devices for feeding cooling air.

11. The brake disk according to claim 10, wherein the T-shaped support elements are each formed of two L-shape sections, base sides of the two L-shape sections adjoining one another and extending radially into the air channel, longitudinal legs of the L-shape sections each projecting radially inward over the inner peripheral area of the friction rings.

12. The brake disk according to claim 11, wherein axial openings are configured between the longitudinal legs of the L-shaped sections, said axial openings leading into the feeding devices and/or forming a portion of the feeding devices.

13. A brake disk for a pneumatically operated disk brake of a vehicle, comprising:
two friction rings mutually connected by way of links, between which at least one air channel is configured;
support elements molded to an inner peripheral area of the brake disk and designed to engage in cams of a hub on an axle of the vehicle;
wherein the support elements on the inner peripheral area of the brake disk bridge the air channel in a link manner, and wherein outer surfaces of the two friction rings are situated at an axial distance from outer surfaces of the support elements such that the axial distance of the outer surfaces of the friction rings from the outer surfaces of the support elements meets the condition: $3<=bs/s<=6$, where s is the axial distance and bs is a thickness of the brake disk;
wherein the support elements are provided with feeding devices for feeding cooling air into the air channel;
wherein the feeding devices are bores extending essentially radially with respect to the brake disk; and
wherein the support elements have an essentially T-shape, such that webs of the T-shape are provided with the radially extending feeding devices for feeding cooling air.

14. The brake disk according to claim 13, wherein the T-shaped support elements are each formed of two L-shaped sections, base sides of the two L-shaped sections adjoining one another and extending radially into the air channel, longitudinal legs of the L-shaped sections each projecting radially inward over the inner peripheral area of the friction rings.

15. The brake disk according to claim 14, wherein axial openings are configured between the longitudinal legs of the L-shaped sections, said axial openings leading into the feeding devices and/or forming a portion of the feeding devices.

16. A brake disk, comprising:
a first friction ring;
a second friction ring spaced apart from said first friction ring;
at least one link coupling inner surfaces of the first and second friction rings in a parallel relationship;
support elements formed on the inner surfaces of the first and second friction rings, said support elements extending radially inward beyond the inner periphery of the first and second friction rings to allow mounting of the brake disk;
wherein the outer surfaces of the first and second friction rings are at an axial distance from outer surfaces of the support elements; and
wherein the support elements have an essentially T-shape, such that webs of the T-shape are provided with radially extending feeding devices for feeding cooling air.

17. A brake disk, comprising:
a first friction ring;
a second friction ring spaced apart from said first friction ring;
at least one link coupling inner surfaces of the first and second friction rings in a parallel relationship;
support elements formed on the inner surfaces of the first and second friction rings, said support elements extending radially inward beyond the inner periphery of the first and second friction rings to allow mounting of the brake disk;
wherein the outer surfaces of the first and second friction rings are at an axial distance from outer surfaces of the support elements;
wherein the support elements have an essentially T-shape, such that webs of the T-shape are provided with radially extending feeding devices for feeding cooling air; and
wherein at least, several of said support elements each have a feeding device for feeding cooling air through the support element.

* * * * *